Figure 1:
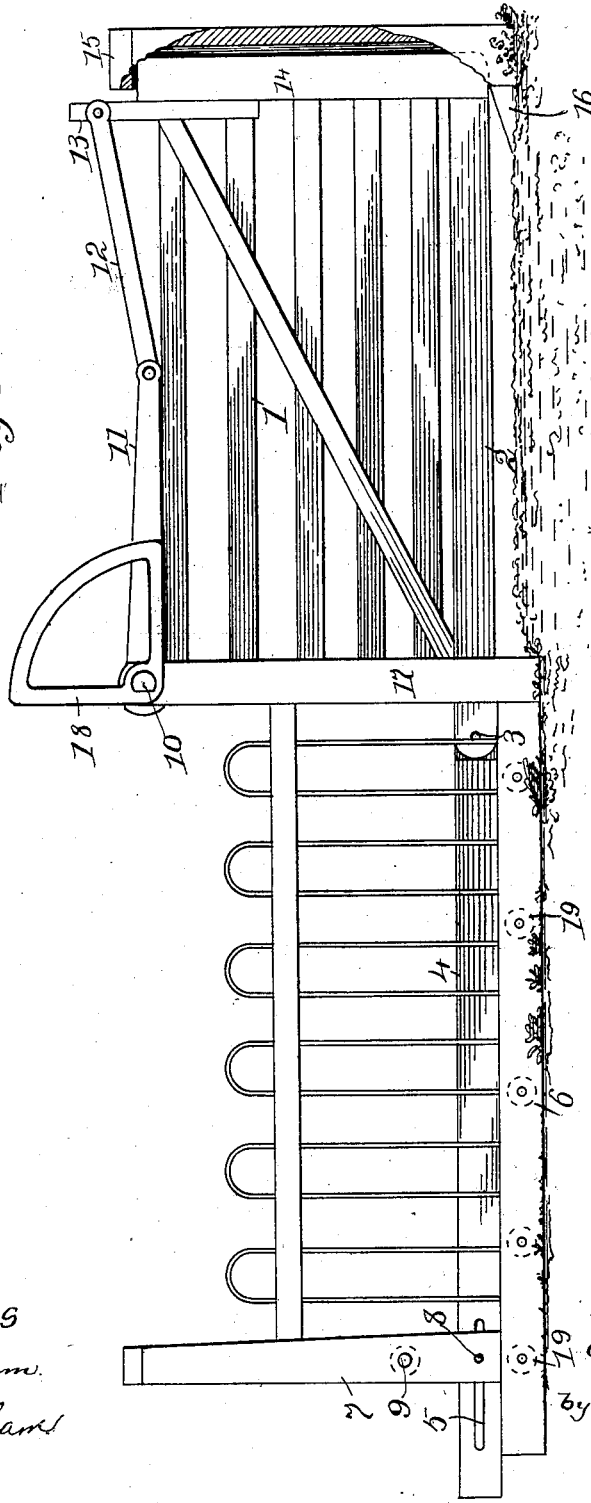

No. 660,323. Patented Oct. 23, 1900.
W. BRADEN.
FARM GATE.
(Application filed July 3, 1900.)

(No Model.) 3 Sheets—Sheet 1.

Witnesses
Nora Graham
Ina Graham

Inventor,
Wade Braden
by L. P. Graham
his attorney

THE NORRIS PETERS CO., PHOTO-LITHO., WASHINGTON, D. C.

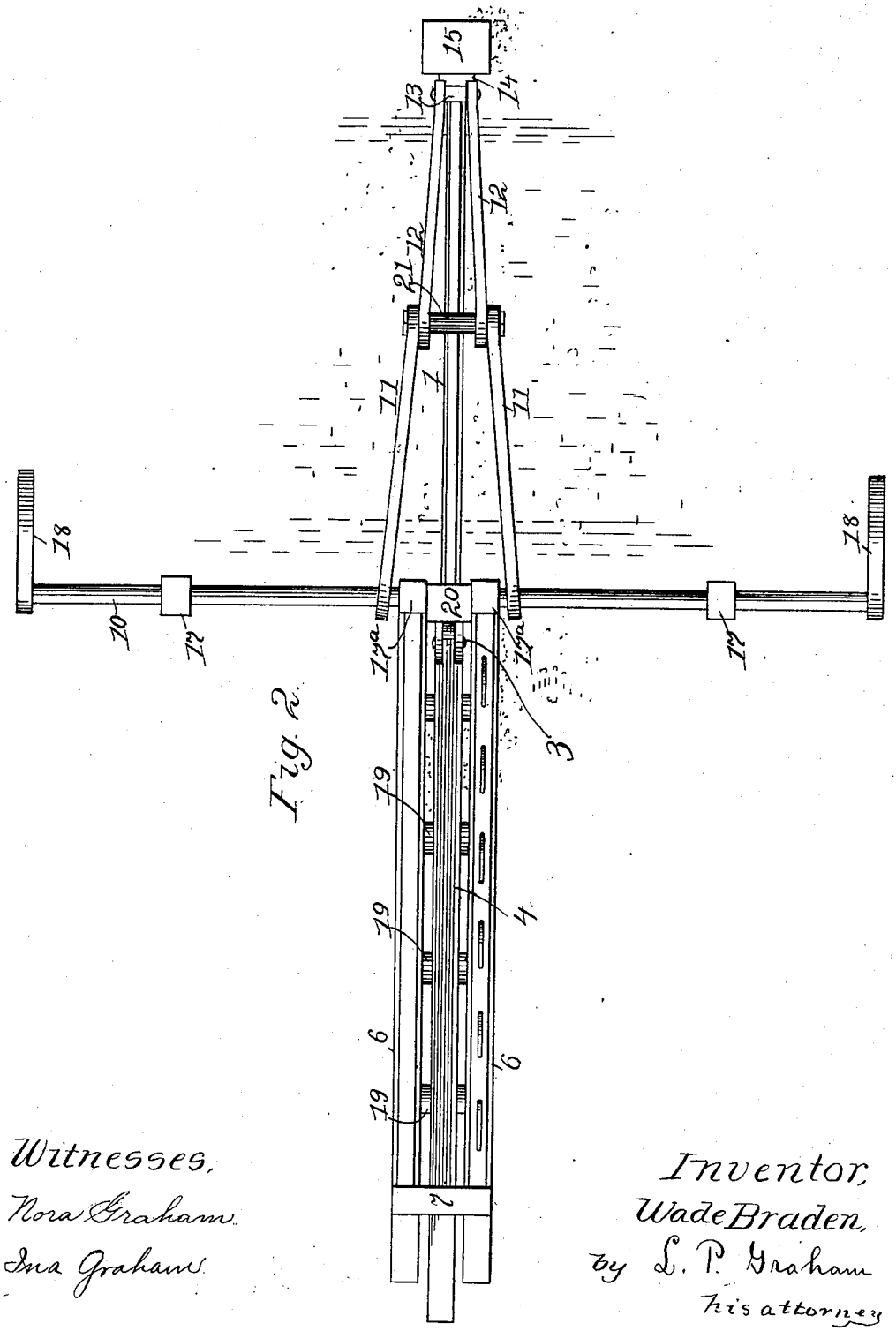

No. 660,323.  
W. BRADEN.  
FARM GATE.  
(Application filed July 3, 1900.)  
Patented Oct. 23, 1900.
(No Model.)  
3 Sheets—Sheet 3.
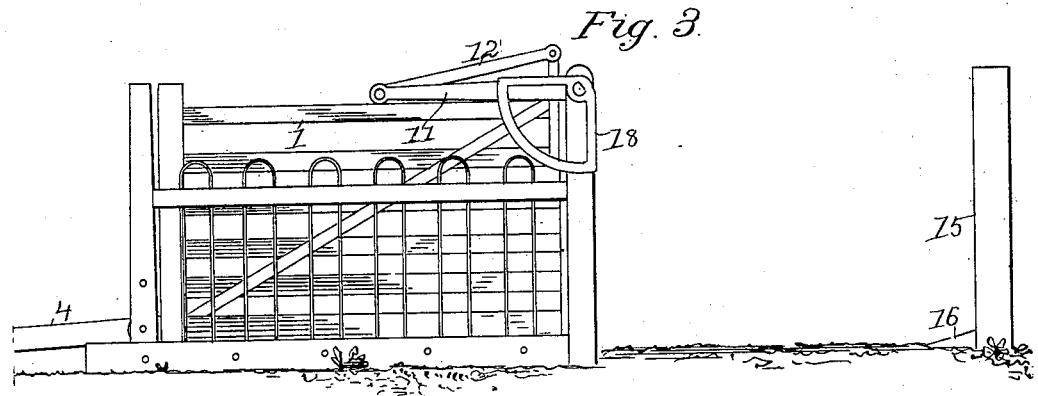
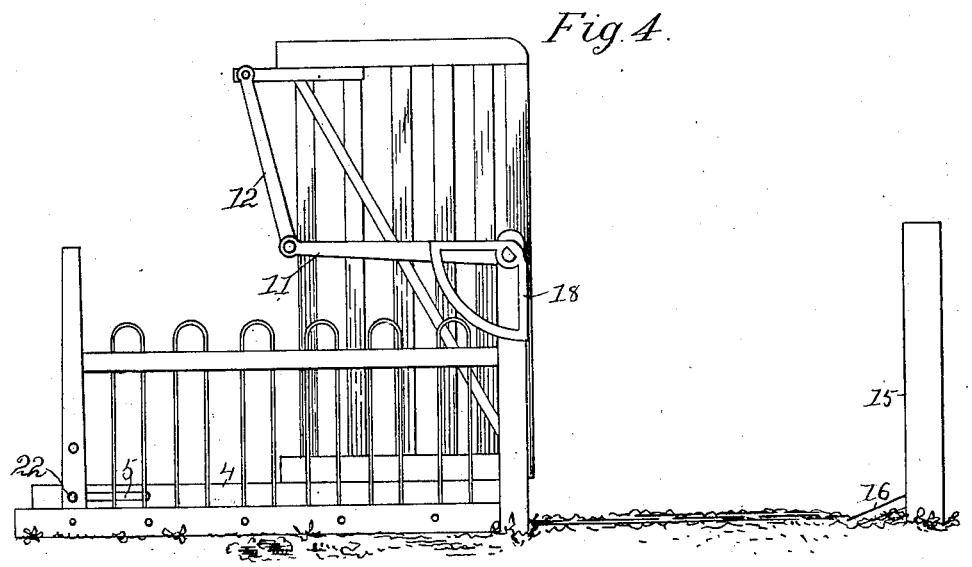
Witnesses,  
Nora Graham.  
Ina Graham.
Inventor,  
Wade Braden,  
by L. P. Graham  
his attorney

UNITED STATES PATENT OFFICE.

WADE BRADEN, OF MAROA, ILLINOIS.

FARM-GATE.

SPECIFICATION forming part of Letters Patent No. 660,323, dated October 23, 1900.

Application filed July 3, 1900. Serial No. 22,391. (No model.)

To all whom it may concern:

Be it known that I, WADE BRADEN, of Maroa, in the county of Macon and State of Illinois, have invented a certain Improved Farm-Gate, of which the following is a specification.

This invention provides a gate that may be either slid or tilted to open and close it and that is locked closed or opened by the opening and closing mechanism. It is exemplified in the structure hereinafter described, and it is defined in the appended claims.

In the drawings forming part of this specification, Figure 1 is a side elevation of a gate constructed in accordance with my invention. Fig. 2 is a plan of the gate. Fig. 3 is a side elevation showing the gate opened by sliding. Fig. 4 is a side elevation showing the gate opened by tilting.

The gate 1 is made in any suitable manner, and its lower rail 2 is hinged at its inner end to a slide-rail 4, as shown at 3 in Fig. 1. The slide-rail 4 extends inward in line with the gate. It rests on rollers 19, journaled in sills 6, it runs under a roller 9, and it passes between the members of a divided post 7. A slot 5 is formed through the inner end of the slide-bar in position to aline with a pin-hole 8 in post 7 when the gate is closed. The outer stile 14 of the gate rests on an inclined block 16 when the gate is closed and it enters a recess in post 15. The recess in the post admits the stile of the gate when the gate is moved endwise toward the post and it effectively retains the gate against upward or sidewise swing. A pair of shafts 10 are journaled in posts 17 and 17ª, and they have handles, as 18, by means of which they may be rocked. Arms 11 are fastened onto the rock-shafts, so as to partake of the rocking motion thereof, and links 12 connect the swinging ends of the arms with an upward extension 13 of the outer end of the gate. The rail 2 extends inward beyond the inner stile 20 of the gate, as is shown clearly in Fig. 2, and the pivot 3 is on such inward extension. A strut 21 is interposed between the swinging ends of arms 11, as is shown in Fig. 1, and such strut rests on the top rail of the gate when the gate is closed or entirely opened.

When the gate is closed, the connection between the arms 11 and links 12 drops slightly below a line drawn from shafts 10 to the pivotal connection of the arms with extension 13 and forms a dead-center lock to hold the gate against backward slide. When the shafts 10 are rocked in a direction to open the gate, the arms 11 are swung upward and the links draw the gate first out of the recess in post 15 and by continued motion carry it entirely open. The gate may be opened by endwise motion, as shown in Fig. 3, or by an upward tilt, as shown in Fig. 4.

If the rail 4 is left free to travel endwise on the rollers 19, the gate will follow the rail and slide open without tilting; but if the endwise motion of rail 4 is restrained the gate will tilt on hinge 3 and swing upward on such hinge. When it is desired to tilt the gate open, a pin 22 (shown only in Fig. 4) is inserted through hole 8 of post 7 and through slot 5 of rail 4, and as soon as the endwise travel of the rail carries the gate clear of the recess in post 15 the pin will bear against an end of slot 5 and by arresting further motion of the rail will compel the gate to tilt on hinge 3 as arms 11 are rocked backward. As soon as the center of gravity of the gate passes hinge 3 the gate will rock on its connections with the links and carry the rail 4 outward until the hinge is about flush with the outer faces of posts 17ª and the inner end of slot 5 is near pin 22, as is shown in Fig. 4.

In whatever way the gate is opened the closing operation consists of first bringing the outer end of the gate near post 15 and then sliding it up incline 14 into the recess thereof.

I claim—

1. In a gate, the combination of a gate, a slide-rail in line with the gate and hinged to the lower, inner corner thereof, a shaft at right angles with the gate, an arm on the shaft, a stiff link connecting the swinging end of the arm with the outer end of the gate and means for controlling endwise motion of the slide-rail, substantially as described.

2. In a gate, the combination of a gate, a slide-rail hinged to the inner, lower corner of the gate at one end and slotted lengthwise at the other end, a post adjacent to the slot of the rail, when the gate is closed, a pin to engage the slot of the rail and connect with the post, a shaft at right angles with the gate, an arm on the shaft and a stiff link connecting the swinging end of the arm with the outer end of the gate, substantially as described.

In testimony whereof I sign my name in the presence of two subscribing witnesses.

WADE BRADEN.

Witnesses:
ROSA VOELCKER,
L. P. GRAHAM.